United States Patent
Beacham (10) Patent No.: US 9,288,142 B2
(45) Date of Patent: Mar. 15, 2016

(54) ROUTER AND SYSTEM FOR INTERCONNECTING NETWORKS HAVING DIFFERING LEVELS OF SECURITY CLASSIFICATION

(75) Inventor: Richard Patrick Todd Beacham, New Milton (GB)

(73) Assignee: BAE SYSTEMS PLC, London (GB)

( * ) Notice: Subject to any disclaimer, the term of this patent is extended or adjusted under 35 U.S.C. 154(b) by 123 days.

(21) Appl. No.: 13/978,692

(22) PCT Filed: Dec. 15, 2011

(86) PCT No.: PCT/GB2011/052486
§ 371 (c)(1),
(2), (4) Date: Jul. 8, 2013

(87) PCT Pub. No.: WO2012/093243
PCT Pub. Date: Jul. 12, 2012

(65) Prior Publication Data
US 2013/0279499 A1    Oct. 24, 2013

(30) Foreign Application Priority Data

Jan. 7, 2011  (EP) .................................. 11275002
Jan. 7, 2011  (GB) .................................. 1100202.9

(51) Int. Cl.
*G01R 31/08* (2006.01)
*H04L 12/725* (2013.01)
*H04Q 3/00* (2006.01)
*H04L 29/06* (2006.01)

(52) U.S. Cl.
CPC ............ *H04L 45/308* (2013.01); *H04L 63/105* (2013.01); *H04Q 3/00* (2013.01); *H04L 63/302* (2013.01)

(58) Field of Classification Search
CPC ....... H04Q 3/00; H04Q 3/0008; H04Q 3/001; H04L 63/105; H04L 12/00; H04L 12/02; H04L 12/04; H04L 49/10; H04L 63/00; H04L 63/302
See application file for complete search history.

(56) References Cited

U.S. PATENT DOCUMENTS 5,832,228 A    11/1998   Holden et al.
6,012,632 A    1/2000    Bouthillier et al.
(Continued)

FOREIGN PATENT DOCUMENTS

GB       2 454 309 A       5/2009
WO       WO 96/30840 A1    10/1996

OTHER PUBLICATIONS

International Search Report (PCT/ISA/210) issued on May 2, 2012, by the British Patent Office as the International Searching Authority for International Application No. PCT/GB2011/052486.
(Continued)

*Primary Examiner* — Anh Ngoc Nguyen
(74) *Attorney, Agent, or Firm* — Maine Cernota & Rardin (57) ABSTRACT

A communications network router is described for secure routing of calls between domains of different classification levels. The network router includes a first communications port arranged to receive a first communications channel of a first domain, a second communications port arranged to receive a second communications channel of a second domain, a switch apparatus arranged selectively to connect the first port to the second port to establish a communications link between the first and second domains. The first domain has a different level of classification to the second domain.

14 Claims, 4 Drawing Sheets

(56) References Cited

U.S. PATENT DOCUMENTS

| | | | |
|---|---|---|---|
| 6,092,724 | A | 7/2000 | Bouthillier et al. |
| 6,219,792 | B1 | 4/2001 | Bouthillier et al. |
| 6,272,538 | B1 | 8/2001 | Holden et al. |
| 2009/0141119 | A1* | 6/2009 | Winegard ............... 348/14.08 |
| 2009/0147069 | A1* | 6/2009 | Winegard ............... 348/14.08 |
| 2010/0005179 | A1 | 1/2010 | Dickson et al. |
| 2010/0009715 | A1* | 1/2010 | Enzmann ................... 455/557 |
| 2010/0115630 | A1 | 5/2010 | Maire et al. |
| 2010/0296444 | A1* | 11/2010 | Masiyowski et al. ......... 370/328 |
| 2010/0296507 | A1 | 11/2010 | Masiyowski et al. |
| 2010/0299724 | A1 | 11/2010 | Masiyowski et al. |

OTHER PUBLICATIONS

Search Report issued on Jul. 31, 2012, by the European Patent Office for Application No. 11275002.1.

Search Report issued on Apr. 28, 2011, by the British Patent Office for Application No. 1100202.9.

Notification Concerning Transmittal of International Preliminary Report on Patentability (Forms PCT/IB/326 and PCT/IB/373) and the Written Opinion of the International Searching Authority )Form PCT/ISA/237) dated Jul. 18, 2013, issued in corresponding International Application No. PCT/GB2011/052486. (6 pgs.).

* cited by examiner

ROUTER AND SYSTEM FOR INTERCONNECTING NETWORKS HAVING DIFFERING LEVELS OF SECURITY CLASSIFICATION

The present invention relates to a communications system and network router and particularly to a manually operable apparatus for routing voice communication between secure domains within the communications system.

On a battlefield, or in a surveillance scenario, the security and confidentiality of communication channels is of the upmost importance and should be protected at all cost. Levels of communication between allied forces and civilians having access to a level of confidentiality above a standard, unclassified, level should be excluded from others who do not have access to such information.

It becomes important to maintain the security level and authentic nature of the relevant communication channels in order to ensure that information of an unsuitable nature is not passed to those without the appropriate level of clearance.

Without a secure communication route or channel appropriate for the communication and the level of classification, the transfer and disclosure of information becomes risky and uncertain.

In the situation where a secure, high level communication channel has been established that is not accessible to those without the appropriate level of clearance it can mean that communication with those without the same level of clearance must be via a different network. Establishing two or more clearly distinct networks or communication systems to enable separate classified and unclassified channels to operate can be a limitation and undesirable additional expense for an operation.

The present invention aims to provide an alternative network router and system for a communication system suitable for use with all levels of protective marking and security clearance.

According to a first aspect, the invention provides a communications network router comprising a first communications port arranged to receive a first communications channel of a first domain, a second communications port arranged to receive a second communications channel of a second domain, a switch apparatus arranged selectively to connect said first port to said second port to establish a communications link between said first and second domains, wherein said first domain has a different level of classification to a said second domain. The router and switch apparatus provides a communication channel that connects between two domains having different levels of protective marking. A manual switch may be operable to control selective connection of said first port to said second port. The choice and connection of the first and second port to establish a link between two different domains is in this way manually controlled and effected by a human operator, advantageously providing a cross check or 'sense' check before making a connection. The manual switch comprises a double poled switch in the illustrated embodiment described herein.

The use of a manual switch prevents signalling or any other data being transferred between secure domains, especially where the voice communications on those domains uses, for example, VoIP. Further, the use of a manual switch provides a mechanical break between domains.

In an embodiment, the first domain has a higher level of security classification than the second domain and in an embodiment the security classification of the second domain has a protective marking of Unclassified. In this embodiment the switchboard enables a conversation to take place between domains of different security classifications, but that retains and authenticates a safe and secure communication channel for the exclusive use of those having a particular level of security classification.

A visual indicator is arranged in an embodiment to indicate a successful connection and conversation between a user in the first channel and a user in the second channel, in this way an operator can see that a conversation has been connected and the domains that are now connected by that conversation. The router and switch with visual indicator also provide a secure and trusted disconnection of the communications link created between the first domain and the second domain.

There is also in the embodiment at least one monitor and access port arranged to monitor conversation on one or more of a first channel and a second channel. The operator can therefore listen in on the conversation and the port provides a 'jack' or access point for monitoring. The access point allows the operator to break into the call and speak directly to one or other of the connected users. This may be necessary where a first user on a first domain with a security level that is protectively marked needs to be reminded that the communication line is to a user in a second domain that has a protective marking of unclassified. The operator can warn the user if material is disclosed that may not be appropriate for the call.

In an embodiment the first channel comprises a Voice Over Internet Protocol, VOIP, phone line and the second channel comprises a VOIP phone line. This means the IP (Internet Protocol) voice communication enters the switchboard as an IP signal on the communication channels and IP voice signals are then converted to analogue for the connection and processing at the router.

According to a second aspect, the invention provides a communications network comprising a plurality of secure network ports, and a communications network router as described above arranged selectively to connect a first said secure network port to a second said secure network port to establish a communications link between said first and second domains, wherein said first domain has a different level of classification to a said second domain.

In an embodiment the communications network includes a barrier apparatus arranged to operate in a fail safe mode.

According to a third aspect, the invention provides a method of configuring a communications network router comprising establishing communication between a first domain and a second domain comprising the steps of;
  (i) receiving a first communications channel of a first domain at a
  (ii) receiving a second communications channel of a second domain at a second communications port,
  (iii) initiating a connection process selectively to connect said first port to said second port to establish a communications link between said first and second domains.
    wherein said first domain has a different level of classification to a said second domain.

In an embodiment the method includes the step of initiating a connection process comprising a handshake, identification and verification procedure. In the embodiment described the handshake, identification, validation and verification procedure are VOIP procedures.

The communications network router and network provides a system particularly suitable for use in battlefield communication and with all levels of security clearance and classification but that retains and authenticates a safe and secure communication channel for the exclusive use of those having a particular level of security classification. The manual operation and active requirement for connection between domains has advantages over a more complex software implementation.

The present invention will now be described in greater detail, by way of example only, with reference to the accompanying drawings, in which.

In the description below the following protective markings are used to designate different levels or domains of security classification; Domain A; Domain B, and Domain U (protective marking of Unclassified). In addition Domain C is introduced, to accommodate personnel who must have access to protectively marked material for operational reasons, but who are regarded as Uncleared by the relevant authorities. In this description there is a hierarchy of protective markings. Domain A is higher than all other domains; Domain U (Unclassified) is lower than all other domains; Domain B is lower than Domain A, but higher than Domain U; Domain C is lower than Domain A, but higher than Domain U. Domain C and Domain B are mutually distrustful: they both consider the other to be lower than themselves.

The system of the embodiment is suitable for use with a data network system that provides a data network to its users but does not provide any data application systems for that network. Security properties of those data application systems must therefore be assumed, and those assumptions enforced through a code of connection for internal data application systems. Information with a particular protective marking may not enter a security domain with a lower protective marking, but it may enter a security domain with a higher or equal protective marking. The system of the embodiment therefore acts as a gateway between the domains and enables voice communication between a user in a protectively marked domain with a user in an unclassified domain.

Three of the domains (Domain A, Domain B and Domain C) are connected, and calls can be made directly between subscribers in these domains using an existing telephone system. The communications network router and switch of FIG. 1 can be used in a switchboard operation to connect one of these three "secure" voice domains (namely Domain A, Domain B and Domain C) to a domain with a protective marking of Unclassified. Calls cannot be made directly between subscribers from different domains across the switchboard arrangement, but must be connected by an operator, ensuring that only analogue voice connections traverse the manual switchboard between dissimilar domains.

Figure 1:
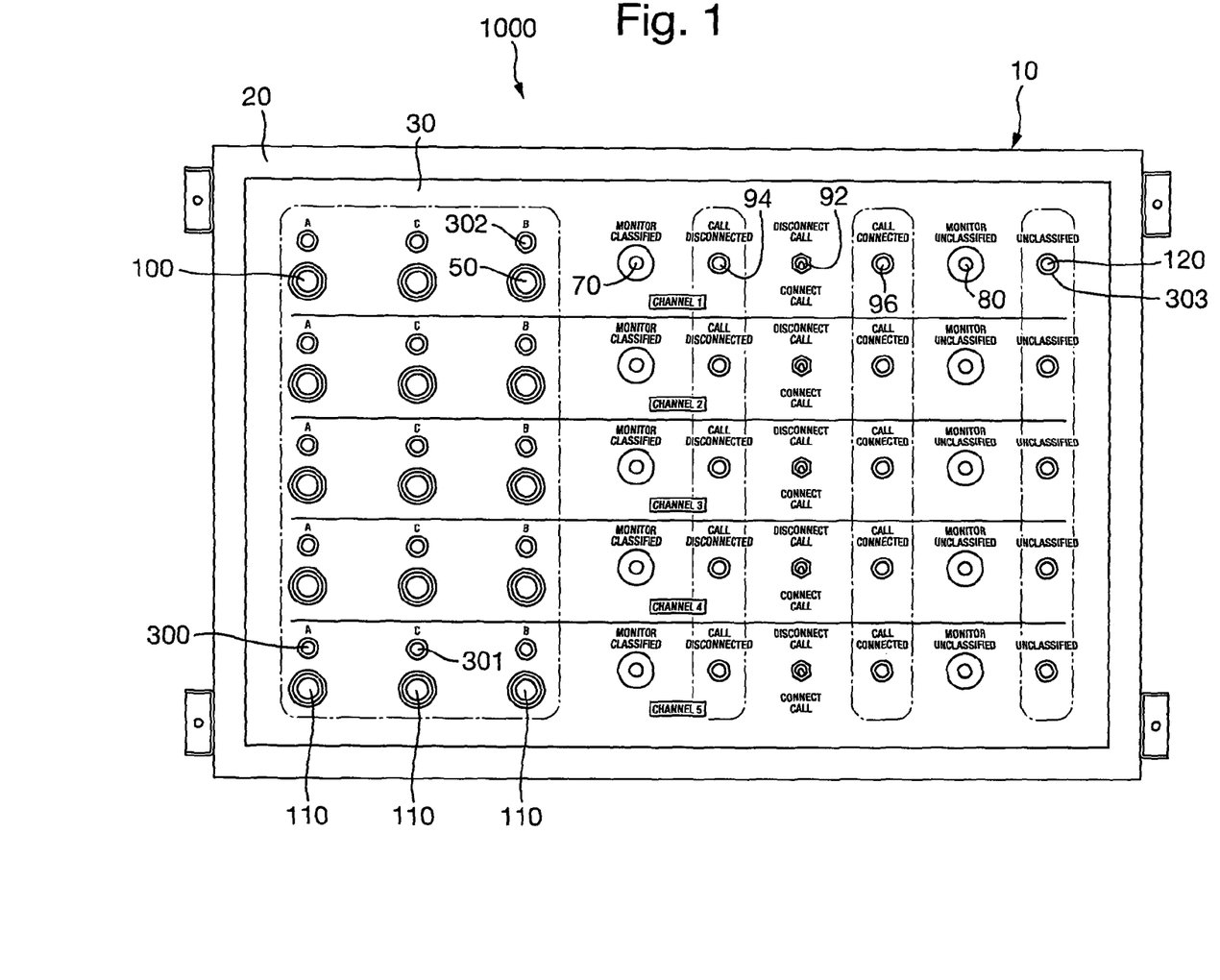
FIG. 1 is a front view of the communication network router apparatus of the present invention.
Figure 2:
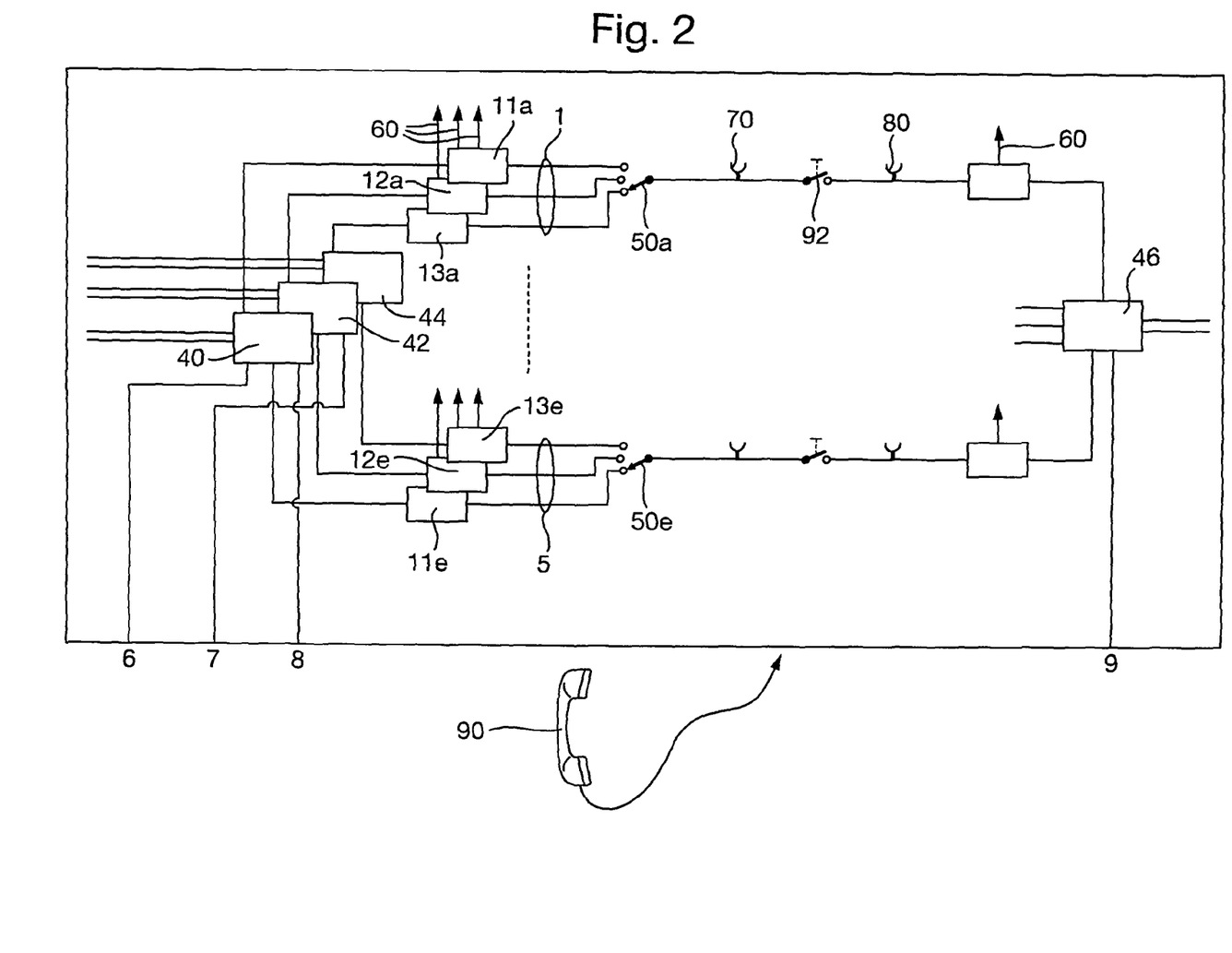
FIG. 2 is a schematic circuit diagram of a communication network router of FIG. 1 showing switching connections into different domains.

Referring now to FIG. 1 and FIG. 2, the details and features of the switchboard are described. The switchboard assembly 1000 is arranged as a generally cuboid shaped housing 10 comprising top face, bottom face, front face 20, rear and side faces. The front face 20 includes a front panel 30 comprising input ports 100 from five channels, each channel accepting and holding a call from a domain. The ports 100 accept calls from different domains and keep the domains separate. The left hand side, when the front panel 30 is viewed as in FIG. 1, ports illuminated at 110 of the front panel 30 represent calls from domains with a protective marking above Unclassified, in this embodiment there are three such domains, namely Domain A, Domain B and Domain C. The right hand side, when the front panel 30 is viewed as in FIG. 1 ports illuminated at 120 of the front panel 30 represent calls from one or more domains with a protective marking of Unclassified.

FIG. 2 shows the switching components and connections for the switchboard. Two channels 1 and 5 are shown in FIG. 2 from the domains (Domain A, Domain B and Domain C) with higher protective marking classification. Channels 1 and 5 can be considered to be the first channel (channel 1) and the fifth channel (channel 5) of the five channels of the embodiment. The channels 1, 5 are representative of the others of the five channels of the embodiment channel 2, channel 3 and channel 4. The location and arrangement of the other channels is intimated as a dotted line in FIG. 2.

The operator has access to a series of external ports connected to one or more external VOIP phones on a plurality of domains over a network of VOIP phones. In the present embodiment there are four external ports 6, 7, 8, 9. Ports 6, 7 and 8 are arranged in communication with the classified telephone network and an operator VOIP phone for each domain. The operator phone allows the operator to answer incoming calls, make outgoing calls and to transfer calls into the switchboard assembly 1000. External port 6 is arranged in communication with the Domain A. External port 7 is arranged in communication with the Domain B. External port 8 is arranged in communication with the Domain C. The ports 6, 7, 8 and 9 are arranged such that in use, as described below, the ports and a VOIP phone connected to the ports are accessed and controlled by the switchboard operator.

Channel 1 and channel 5 (also channel 2, 3 and 4, although not shown) are arranged in operable communication with the external ports 6, 7, 8 and 9 and the IP phone cards 11a . . . 11e, 12a . . . 12e, 13a . . . 13e, via ethernet switches 40, 42, 44 and 46 as in known in VOIP communications systems. Ethernet switches 40, 42, 44 are arranged to connect the classified VOIP telephone networks to appropriate classified domains on channels 1 to 5. Ethernet switch 46 is arranged to connect the VOIP telephone network with protective marking of unclassified to the manual switchboard from the unclassified domain. Each ethernet switch 40, 42, 44, 46 comprises a pair of fibre optic (FO) ethernet ports and six copper ethernet ports. Each fibre optic FO port is presented at a connector on the switchboard housing 10 allowing either a single ended connection to the external system or insertion into a fibre ring topology. VOIP data from each of the domains (Domain A, Domain B and Domain C and Domain U) enters the switchboard assembly 1000 through these fibre optic FO ports.

Five of the six copper ports from each ethernet switch 40, 42, 44, 46 are used inside the switchboard assembly 1000 (one per channel) with the sixth port exiting at a connector on the switchboard housing 10 for connection to the external Operator VOIP phone. VOIP data passes from each copper port to a switchboard IP phone card device.

Each channel 1, 5, includes an IP (internet protocol) phone card device or other printed circuit board apparatus for each of the three classified domains for routing a call from any one of the three classified domains. Each channel therefore includes three IP phone devices. The VOIP phone devices are substantially identical to those used in the external VOIP phone networks for each of the domains; Domain A, Domain B and Domain C. Phone devices 11a, 12a and 13a represent phone devices for the three domains in channel 1, phone devices 11e, 12e, 13e represent phone devices for the three domains in channel 5. The phone devices act, in use, to receive VOIP data from a copper port on one of the Ethernet switches 40, 42, 44, 46 and to convert the VOIP voice to analogue and output the call as analogue voice data.

A domain selection switch 50 is provided in each channel 1, ... 5, and arranged such that an operator can act to select a line from one of the three domains in the classified network. The selection switch 50 is shown as 50*a* for channel 1 and 50*e* for channel 5. The selection switch comprises a latching relay switch and permits selection of the analogue audio signals from one classified domain to be routed through the switchboard assembly 1000. The control of selection switch 50 can be implemented with a simple push-button latch for on or off.

A number of connection indicators 60 in the form of illuminable portions of the selection switch 50 of the classified or the unclassified domains are provided and serve to indicate correct switching of the relay switches. The illuminable portion in the preferred embodiment may comprise an outer illuminable ring encircling the push-button selection switch 50 for each domain or a separate connection indicator.

Headset sockets 70, 80 in the front panel 30 are provided on both sides of the physical barrier separating classified and unclassified domains. This allows the operator to plug their headset 90 into the sockets 70, 80 and talk to callers before connection or during a conversation. When a connection has been established the Operator can plug into either socket to monitor both sides of the conversation but will need to plug into the appropriate side to talk to an offending party.

Figure 3:
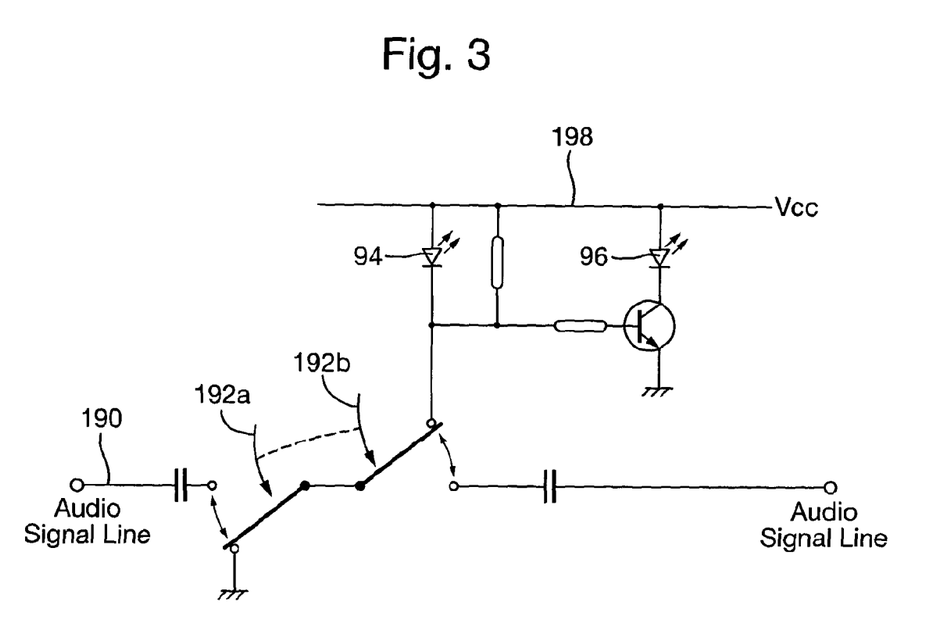
FIG. 3 is a schematic diagram of the implementation of a manual switch of the present invention.

A manual connection switch 92 is manually operable with a lever mounted on the front panel 30. The connection switch 92 comprises a set of two switches connected in series and in the embodiment described comprises a toggle switch mounted on the front panel 30. FIG. 3 shows the components of the manual connection switch 92 in further detail. An audio line 190 is shown as representing an input from an VOIP phone. The manual connection switch 92 comprises two double poled switches 192. The switches 192 are arranged in a series in a multi-gang arrangement and have a mechanically open position (open audio signal line) and a mechanically closed position. In the mechanically open position, illustrated in FIG. 3, the switchboard assembly 1000 connection has been broken. The broken circuit features one double poled switch 192*a* open to ground and the other switch 192*b* open and connected to a first LED 94 and a positive power rail or power supply line 198. In this configuration the LED 94 is on and powered when both multi poled switches 192*a* and 192*b* are open, indicating to the operator with a positive visual indication that the switchboard audio connection is broken.

In contrast the LED 96 is illuminated when audio line 190 is closed and the multi poled switches 192*a* and 192*b* are in a closed position. Then the LED 96 is connected to the positive power rail or power supply line 198. In this configuration the LED 96 is on and powered when both multi poled switches 192*a* and 192*b* are closed, indicating to the operator with a positive visual indication that the switchboard audio connection is connected.

Other elements such as standard resistors and capacitors are provided in the circuit as necessary and with values of capacitance and resistance as would be known in the art.

The connection switch 92 is arranged to control the action of relay switches arranged in the audio signal path from the networks in domains A, B and C to the unclassified (Domain U) VOIP phone devices. A Call Connected indicator and a Call Disconnected indicator comprising a red LED 94 and a green LED 96 respectively are controlled via the same relay switches thus monitoring the action of the relay contacts and warning of contact failure. With the toggle switch in an upper position, the call is not connected and an illuminated red LED 94 serves to indicate a failed connection of a call between a domain such as Domain A, B or C and the domain with the protective marking of unclassified, Domain U. With the toggle switch in a lower position, the call is connected and an illuminated green LED 96 would act to indicate a successful call between a domain such as Domain A, B or C and the domain with the protective marking of unclassified, Domain U. The combination of connection switch 92, LED 94 and LED 96 also provide security and indication of a trusted disconnection for the operator as will be described in further detail below.

The front panel 30 includes a series of indicator lights 300, for connection indicators and the lights are arranged and labelled according to the domain classification. The lights 300 comprise LEDs or a similar light source. The lights 300 are connected to a power supply such that they are illuminated and indicate the classification of the domain when the operator routes an incoming call received on the operator's VOIP phone to a particular line on one of the channels 1 to 5. Thus an incoming call is detected and is visible as an illuminated display by a first communications port arranged to receive a first communications channel of a first domain, for example LED 301 is illuminated when a call from Domain C is routed to channel 5 of the switchboard 1000. In a similar manner a second communications port arranged to receive a second communications channel of a second domain, also includes an LED or other visual indication means of the presence of a call on the line.

By the series of relays and switches described above provided in operable communication with both sides of the call the switchboard apparatus 1000 is arranged selectively to connect said first port to said second port, by activation of the manual connection switch 92 by the operator.

Figure 4:
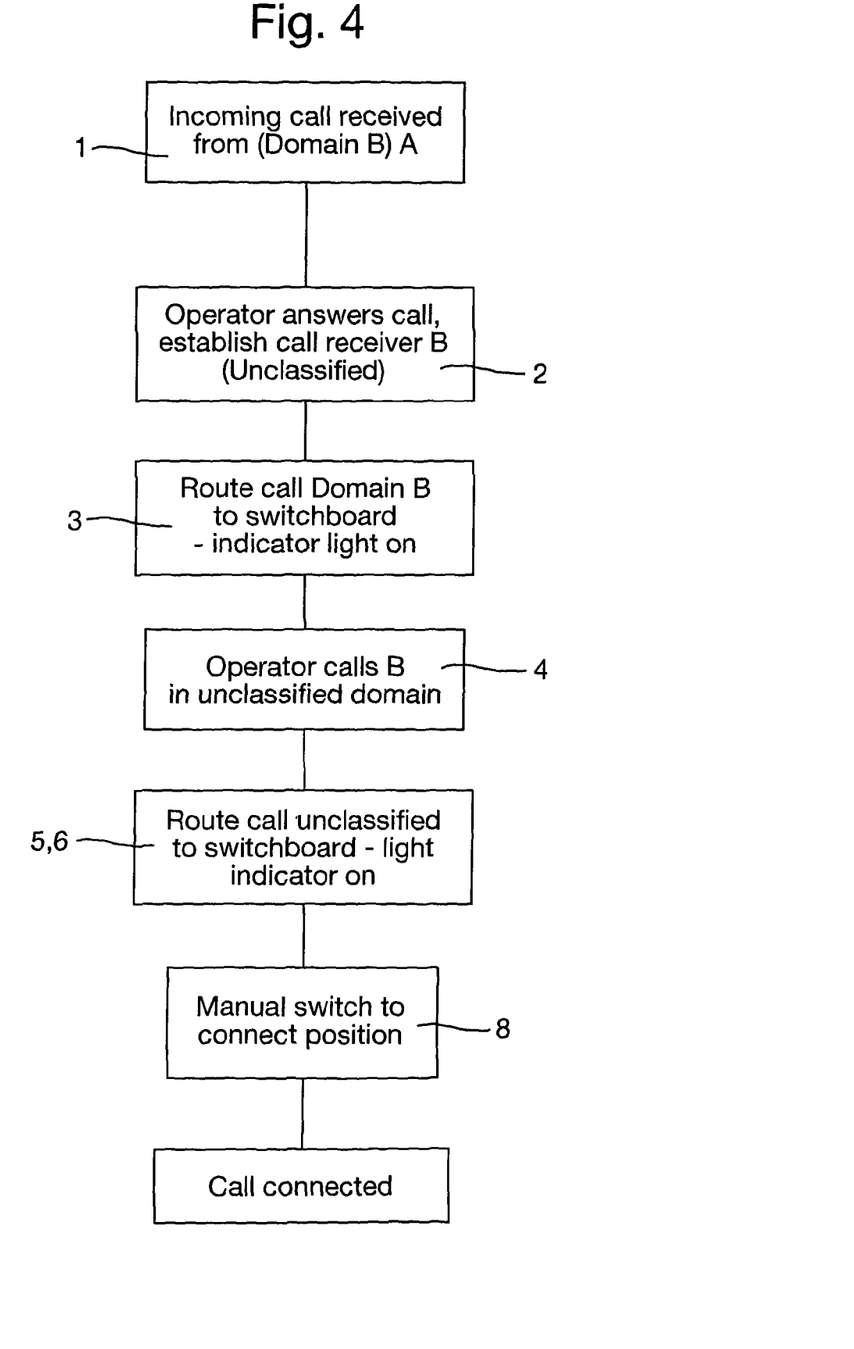
FIG. 4 is a schematic of the operation steps in a communications network and the communication network router of the present invention.

In operation an operator manning the router and the connection switch 92 at the switchboard assembly 1000 would manage incoming calls as will be described below, with reference to FIGS. 1, 3 and 4, the description assumes the system is in an initial state with no callers connected and that a call is made from a domain such as Domain B to the Unclassified domain, Domain U. The initial front panel 30 display would be with the connection switch 92 in the upper toggle switch position on each channel 1, ... 5 and the red LEDs indicating 'CALL DISCONNECT' are illuminated, whilst the green LEDs indicating 'CALL CONNECT' are not illuminated.

1) The operator receives a call from a caller A from the Domain B on the external operator IP phone in the domain, Domain B. The operator answers the call and determines who caller A wants to speak to in the Unclassified domain—B 2) The Operator routes the caller A to one of the channels (1 to 5) that is unused in the switchboard apparatus. If none of the channels are currently in use the default is to route the call from caller A in Domain B to channel 1. A transfer shortcut key or other key stroke is used on the phone handset.

3) The correct transfer of the call from Domain B to channel 1 is confirmed by the channel 1 amber indicator marked 'B' (numbered 302 in FIG. 1) being lit on the front panel 30 of the switchboard assembly.

4) Operator places a call using the external operator Unclassified IP phone to B in the Unclassified domain, domain U.

5) Operator connects the call and forward the call to channel 1 of the manual switchboard 1000 on the Unclassified side using an appropriate keystroke or IP phone instructions as mentioned above at 2) and as would be apparent to one with knowledge in the telephony and communications field 6) The correct transfer of the Unclassified call to channel 1 is confirmed by the channel 1 amber indicator marked 'UNCLASSIFIED' (numbered 303 in FIG. 1) being lit on the front panel 30 of the switchboard assembly.

7) Operator presses the selection switch 50 for the Domain B. The selection switch 50 is a push-button switch, which illuminates as an indication of the successful selection of the call from Domain B in channel 1.

8) Operator connects caller A to B by positioning the manual connection switch 92 to the lower toggle switch position, thus selecting the 'CONNECT CALL' position. This will result in the red LED 'CALL DISCONNECTED' indicator 94 extinguishing and the green 'CALL CONNECTED' indicator 96 being lit.

Additional aspects and features of the operation are set out below;

1) Secure and trusted disconnection of the communications link between A and B is achieved and provides a level of confidence to the operator using the assembly. Failure of connection switch 92 could retain connection between the Unclassified domain and the domain with a higher classification of protective marking. In this instance both switches comprising connection switch 92 are required to fail in order to erroneously maintain a connection between the two domains. The operator would be alerted to the continued existence of this erroneous communications link by the illumination of both red LED indicator 94 and the illumination of green LED indicator, alternatively the failure of one of the two switches could lead to LED indicator 94 or LED indicator 96 remaining unilluminated and being inconsistent with a DISCONNECT CALL or CONNECT CALL position of the connection switch 92. This means that a three fold failure of hardware must occur in order to result in an undetected breach of domain separation and security. Such a breach cannot be generated or simulated from a network or router external to the switchboard assembly.

2) During the conversation between A and B the operator can monitor the call by plugging their headset into monitoring socket 70 or 80. If the operator wants to speak to A then the operator must be plugged into the 'MONITOR CLASSIFIED' socket 70, indicating a call to domain having a higher level of protective classification marking. Similarly, to talk to the B the operator must use the 'MONITOR UNCLASSIFIED' socket 80. The operator has a microphone speaker located in the headset 90. The microphone is in this embodiment activated by pressing a corresponding microswitch located in the lead of the headset 90.

3) Once both callers A and B have finished the call the action of them hanging up will clear the call down resulting in both 'CALL CONNECTED' amber indicators to extinguish. This means the operator can set the channel 1 manual connection switch 92 to its upper toggle position and the 'DISCONNECT CALL' position.

4) In the event of inappropriate information being passed between callers A and B the operator can intervene, by setting the channel 1 manual connection switch 92 to its upper toggle position and the 'DISCONNECT CALL' position. This action will immediately isolate the audio signals between both callers. The operator can then warn either caller using the appropriate monitoring socket 70, 80 on the front panel 30 and reconnect the call by setting channel 1 manual connection switch 92 to its lower toggle position and the 'CONNECT CALL' position. Alternatively, the operator can clear the call down from the IP phones within the switchboard assembly by using a flash override facility on the external operator Domain B and Unclassified VOIP phones.

5) The flash override facility can also be used if a call is not cleared down by both parties, indicated by one of the amber 'Call Connected' indicators being lit on the front panel 30, or if the callers have tied up the channel for too long and there are calls of greater importance that need to use the channel.

6) The domain selection switch 50 has no 'OFF' position and will remain on the last selection made until a different domain is selected by the operator.

The above procedure has been described for one of the five channels available in the switchboard assembly, the procedure can be applied equally for any other of the five channels as each of the channels is in its function substantially identical.

It is important to note in the above operation description that the switchboard assembly 1000 does not allow callers between domains of different protective markings to be connected. Calls can only be routed from a domain such as Domain A, B or C to a domain such as Domain U or vice versa with the switchboard assembly.

Alternatives to the schemes outlined above can be envisaged without departing from the scope of the invention. For example more than five channels could be implemented, more than three domains could be used with higher protective marking and more than one domain without a protective marking could be considered. The security domains may include domains with protective markings from Company Confidential to government/national TOP SECRET. Other protective markings that could be considered include MISSION SECRET, NATO SECRET, COALITION SECRET, UK SECRET, PROTECT, UK Restricted and TOP SECRET. The unclassified domain (with no protective marking) may be considered as an untrusted domain. There may be provided allocation apparatus arranged to allocate a priority status to a communication on a communication channel according to the security classification of the communication channel and the communication. A router may include prioritisation apparatus arranged to prioritise a communication on a communication channel according to the priority status of the communication channel and the communication. This means that a higher priority call can be connected or placed in front of a communication having a lower priority level or incoming on a lower priority communications channel.

In the system described above in the illustrated embodiment two quad fibre connectors per domain are available for connection to an existing VOIP system. This allows the switchboard assembly 1000 to be connected into a fibre ring where both fibre domain connectors are used. In an alternative the switchboard may be connected to a spur where only one fibre connector is used. If more than five channels are required in a system two switchboard assemblies can be co-located and daisy-chained together via the quad fibre connectors for each domain. As described above the switchboard assembly requires one external operator VOIP phone per domain. If two co-located, daisy-chained switchboard assemblies are used in a system only one set of external operator VOIP phones are required since the facility can be treated as a ten channel version.

The invention claimed is:

1. A communications network router comprising:
a first communications port configured to receive a first communications channel of a first domain;
a second communications port configured to receive a second communications channel of a second domain;
a switch apparatus configured to selectively connect said first port to said second port to establish a communications link between said first and second domains, wherein said first domain has a different level of classification relative to said second domain; and a manual switch operable to control selective connection of said first port to said second port, manual operation of said manual switch by an operator being required for each instance of said selective connection of said first port to said second port.

2. The communications network router as claimed in claim 1, wherein the first domain has a higher level of security classification than the second domain.

3. The communications network router as claimed in claim 1, wherein the security classification of the second domain has a protective marking of unclassified.

4. The communications network router as claimed in claim 1, comprising:
    a visual indicator arranged to indicate a successful connection and conversation between a user in the first communications channel and a user in the second communications channel.

5. The communications network router as claimed in claim 1, comprising:
    at least one monitor and access port arranged to monitor conversation on one or more of the first communications channel and the second communications channel.

6. The communications network router as claimed in claim 1, wherein the manual switch is configured to provide a mechanical break between said first and second domains.

7. The communications network router as claimed in claim 1, wherein the manual switch comprises:
    a double poled switch.

8. The communications network router as claimed in claim 1, configured to pass only analogue audio between said first and second domains.

9. The communications network router as claimed in claim 1, wherein the first communications channel comprises:
    a Voice Over Internet Protocol, (VOIP), phone line; and the second communications channel comprises:
    a VOIP phone line.

10. The communications network router as claimed in claim 1, in combination with a communications network comprising:
    a plurality of secure network ports, wherein the communications network router is provided for connecting a first secure network port to a second secure network port for establishing a communications link between said first and second domains, wherein said first domain has a different level of classification relative to said second domain.

11. The communications network router as claimed in claim 1, in combination with a communications network comprising:
    a plurality of secure network ports and an unclassified network port, wherein the communications network router is provided for connecting a secure network port to said unclassified network port to establish a communications link between said first and second domains.

12. A method of establishing communication between a first domain and a second domain, the method comprising:
    (i) receiving by a communications network router of a first communications channel of a first domain at a first communications port;
    (ii) receiving by the communications network router of a second communications channel of a second domain at a second communications port; and
    (iii) an operator manually initiating a connection process to selectively connect said first port to said second port to establish a communications link between said first and second domains, wherein said first domain has a different level of classification to a said second domain.

13. The method of configuring a communications network router as claimed in claim 12, wherein the initiating of a connection process comprises:
    a handshake, identification, validation and verification procedure.

14. The communications network router as claimed in claim 1, comprising:
    a barrier apparatus configured to operate in a fail safe mode.

* * * * *